United States Patent [19]
Truc et al.

[11] Patent Number: 5,392,548
[45] Date of Patent: Feb. 28, 1995

[54] SLIDE MOUNT WITH PIN LOCK REGISTRATION

[75] Inventors: James A. Truc, Eden Prairie; Robert D. Brown, Maple Grove; Edward D. Jansen, Annandale, all of Minn.

[73] Assignee: Pakon, Inc., Minnetonka, Minn.

[21] Appl. No.: 178,447

[22] Filed: Jan. 6, 1994

Related U.S. Application Data

[63] Continuation of Ser. No. 738,506, Aug. 1, 1991, abandoned.

[51] Int. Cl.6 .............................................. G03B 21/64
[52] U.S. Cl. .................................................. 40/159.2
[58] Field of Search ................... 40/158.1, 159.2, 152, 40/611; 354/212

[56] References Cited

U.S. PATENT DOCUMENTS

| | | | |
|---|---|---|---|
| 3,341,960 | 9/1967 | Florjancic et al. | 40/152 |
| 3,470,642 | 10/1969 | Mundt et al. | 40/152 |
| 3,470,643 | 10/1969 | Koeppe et al. | 40/152 |
| 3,478,456 | 11/1969 | Mundt et al. | 40/152 |
| 4,104,818 | 8/1978 | Hrabik | 40/152 |
| 4,250,641 | 2/1981 | Thompson | 40/159.2 |
| 4,607,442 | 8/1986 | Desmarais et al. | 40/159.2 X |
| 4,980,712 | 12/1990 | Maeno | 354/212 |

FOREIGN PATENT DOCUMENTS 2086610  5/1982  United Kingdom ............... 40/158.1

*Primary Examiner*—Kenneth J. Dorner
*Assistant Examiner*—Milton Nelson, Jr.
*Attorney, Agent, or Firm*—Kinney & Lange

[57] ABSTRACT

In a photographic slide mount, a pair of pin locks are included to lock the position of the film. The pin locks are aligned with sprocket holes along the lateral edges of an inserted film transparency and extend therethrough to secure the position of the film in the slide mount. The pin locks are tapered and include recessed corners and a sloped second surface to facilitate their placement through the sprocket holes of the film.

19 Claims, 3 Drawing Sheets

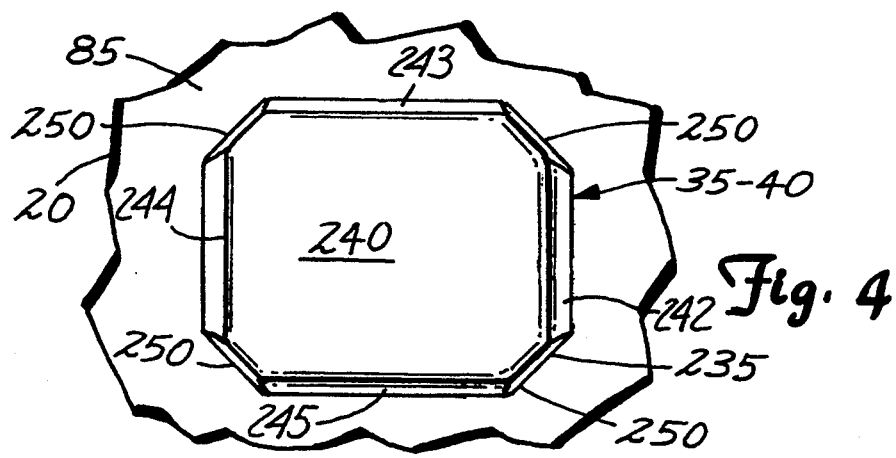
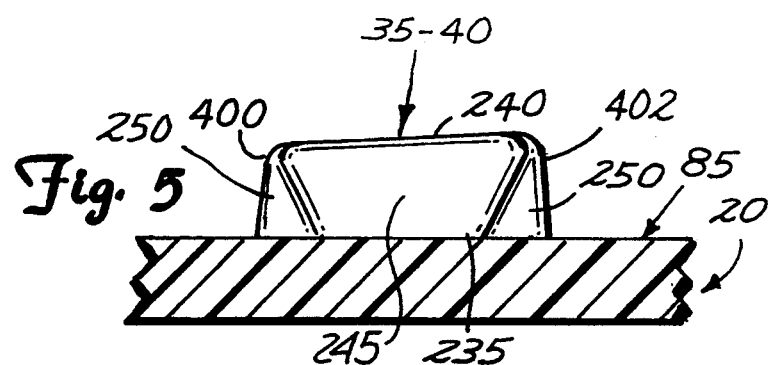
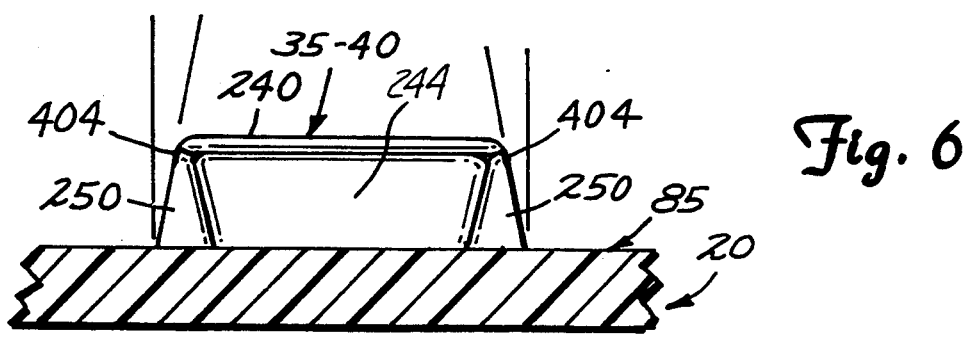

SLIDE MOUNT WITH PIN LOCK REGISTRATION

This is a continuation of application Ser. No. 07/738,506, filed Aug. 1, 1991, and now abandoned. Priority of the prior application is claimed pursuant to 35 USC §120.

BACKGROUND OF THE INVENTION

The present invention relates to a slide mount for mounting film transparencies from a photographic film web to prepare a photographic slide.

Photographic film transparencies are generally severed from a photographic film web and mounted in individual slide mounts to prepare photographic slides. The photographic image of the prepared photographic slide is then viewed in cooperation with a slide projector or other visualizing means.

In particular, slide mounts are generally formed of first and second plastic frame portions connected along an outer border to form a pocket therebetween. The slide mounts include a central aperture defined by film windows formed in each of the first and second plastic frame portions. Further, the slide mount includes a slit along the outer border which defines an insertion opening through which a photographic film transparency is inserted into the pocket between the first and second frame portions. The first and second frame portions are separated at the slit to insert individual film transparencies into the pocket of the slide mount.

After the film transparency is inserted into the pocket of the slide mount, the photographic image of the film transparency should align with the film aperture defined by cooperating film windows of the first and second frame portions so that it can be seen therethrough. Thus, it is important when the film is inserted that it be correctly aligned and secured so that the entire photographic image is visible through the aperture of the slide mount. However, it is often difficult to properly align and maintain the film transparency within the slide mount, particularly when the film is mechanically inserted. Thus, there has been a continuing need to develop a slide mount into which film transparencies can be easily and properly inserted by mechanical means and which will maintain a relatively fixed position for the film transparency inserted therein.

It is important that once the film is inserted, that the position of the photographic image be maintained within the aperture of the slide mount even under adverse conditions. That is, often times, when the film transparency in the slide mount is exposed to different conditions, such as, for example, extreme heat, the film expands and buckles. Thus, there has been a need to develop a slide mount which will accommodate for the expansion of the film without significant buckling.

SUMMARY OF THE INVENTION

The present invention relates to a slide mount for mounting a film transparency of a photographic film web to prepare a photographic slide for viewing. In particular, the slide mount includes a pair of pin locks for securing the position of the inserted film. The pin locks are formed of a bottom surface, a top surface, contact surfaces and non-contact connecting surfaces. The pin locks are aligned with sprocket holes along the lateral edges of an inserted film transparency. First, second third and fourth contact surfaces connect the top and bottom surfaces. The pin locks are designed for insertion through the lateral sprocket holes of the inserted film. The contact surfaces are designed to contact edge surfaces of the sprocket holes to fix the position of an inserted film transparency. The non-contact connecting surfaces join first and second, second and third, third and fourth and fourth and first contact surfaces and are positioned so as not to engage edge surfaces of the sprocket holes, to facilitate insertion of the pin locks through the sprocket holes of the film transparency while the photographic film web is mechanically inserted into the slide mount.

Preferably, the slide mount additionally includes a film track formed of cooperating raised rails extending along opposed sides of a frame portion. The film track is designed to define a tapered mouth portion adjacent to the slit where the film is inserted and a throat portion extending from the mouth along a remaining extent of the pocket of the slide mount. The mouth has a width which is significantly greater than the width of the film transparency to guide the inserted film transparency towards the throat portion. The throat portion is tapered to contact the film towards the rear end of the slide mount to restrict lateral movement thereof. Also, the pin locks are positioned within the mouth of the film track to secure the film transparency at the forward end of the slide mount.

Thus as described, the slide mount of the present invention facilitates the mechanical insertion of a film transparency and fixedly secures the film transparency therein so that the photographic image is positioned within the aperture of the slide mount. Furthermore as described, the slide mount maintains the film under adverse conditions, such as, for example, heat without significant film buckling.

BRIEF DESCRIPTION OF THE DRAWINGS

FIG. 4 is a top plan view of a pin lock as shown in FIG. 3.

FIG. 5 is a side elevational view of the pin lock having a sloped second surface as shown in FIG. 3.

FIG. 6 is a front elevational view of the pin lock as shown in FIG. 3.

DETAILED DESCRIPTION OF THE PREFERRED EMBODIMENT

Figure 1:
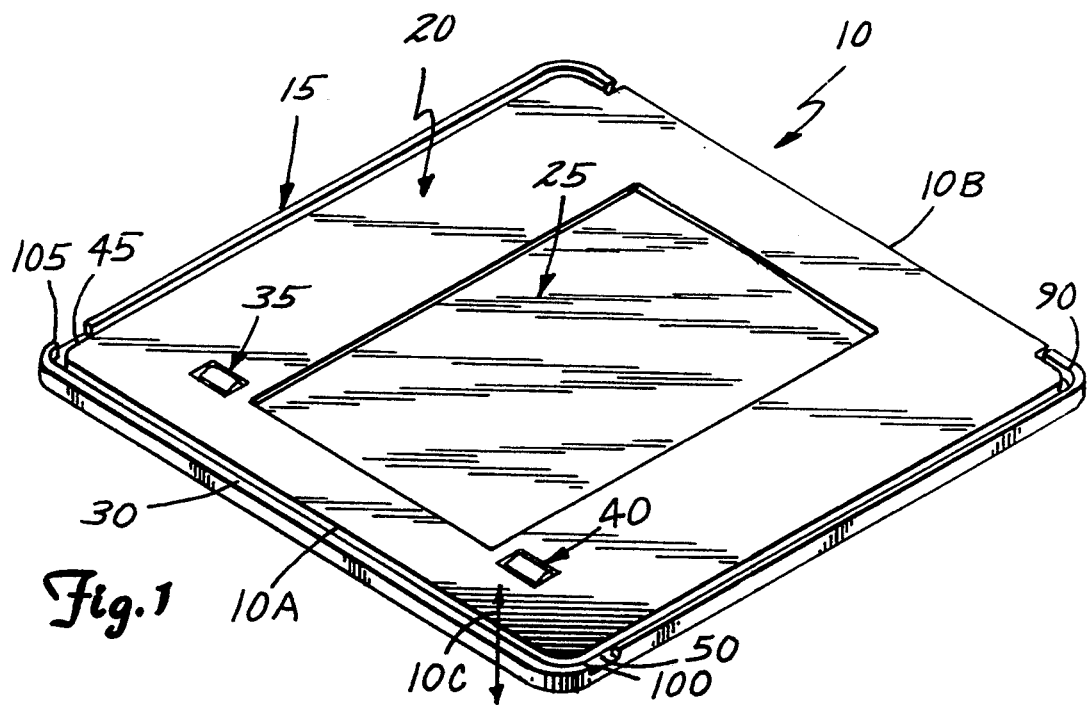
FIG. 1 is a perspective view of a slide mount of the present invention.

FIG. 1 is a perspective view of the slide mount 10 of the present invention. The slide mount 10 is formed of first and second frame portions 15 and 20 and includes a central aperture 25 and slit 30. As shown, the slide mount 10 also includes a pair of pin locks 35 and 40 and opposed camming surfaces 45 and 50.

Figure 2:
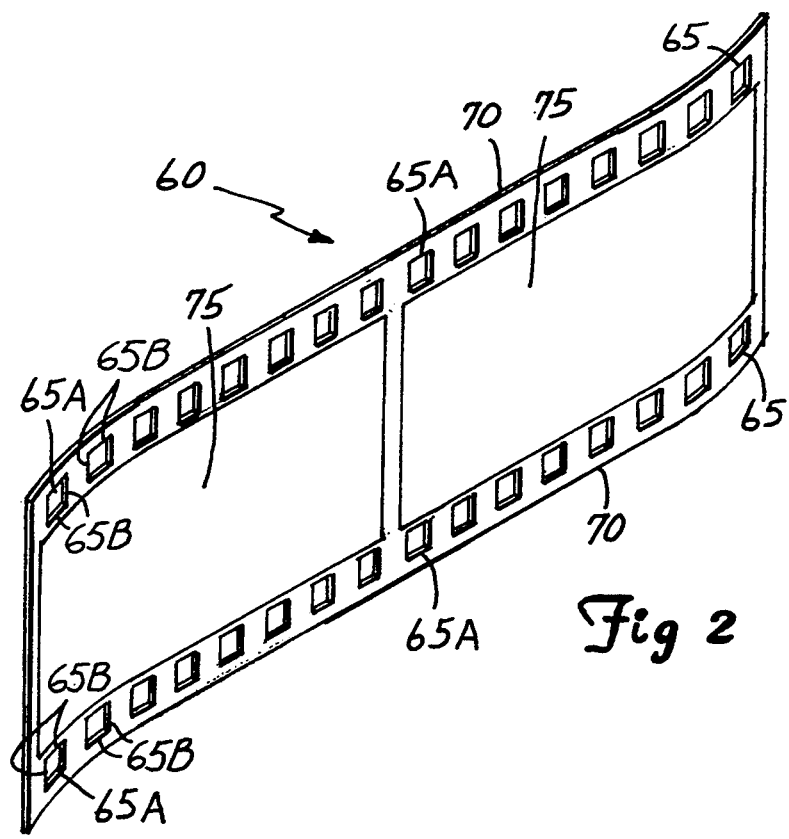
FIG. 2 is a perspective view of a photographic film web having separate film transparencies designed for insertion into the slide mount of FIG. 1.

FIG. 2 illustrates a typical photographic film web 60 having a plurality of sprocket holes 65 extending along the lateral edges 70 thereof. Individual film transparencies 75 are severed from the film web 60 and inserted into a pocket formed between the first and second frame portions 15 and 20 of the slide mount 10. The pin locks 35 and 40 engage the film transparency 75 through final sprocket holes 65A at a trailing end of the film transparency 75, and contact edge surfaces 65B of the sprocket holes 65A to fix the position of the inserted film transparency 75 within the pocket of the slide mount 10.

Figure 3:
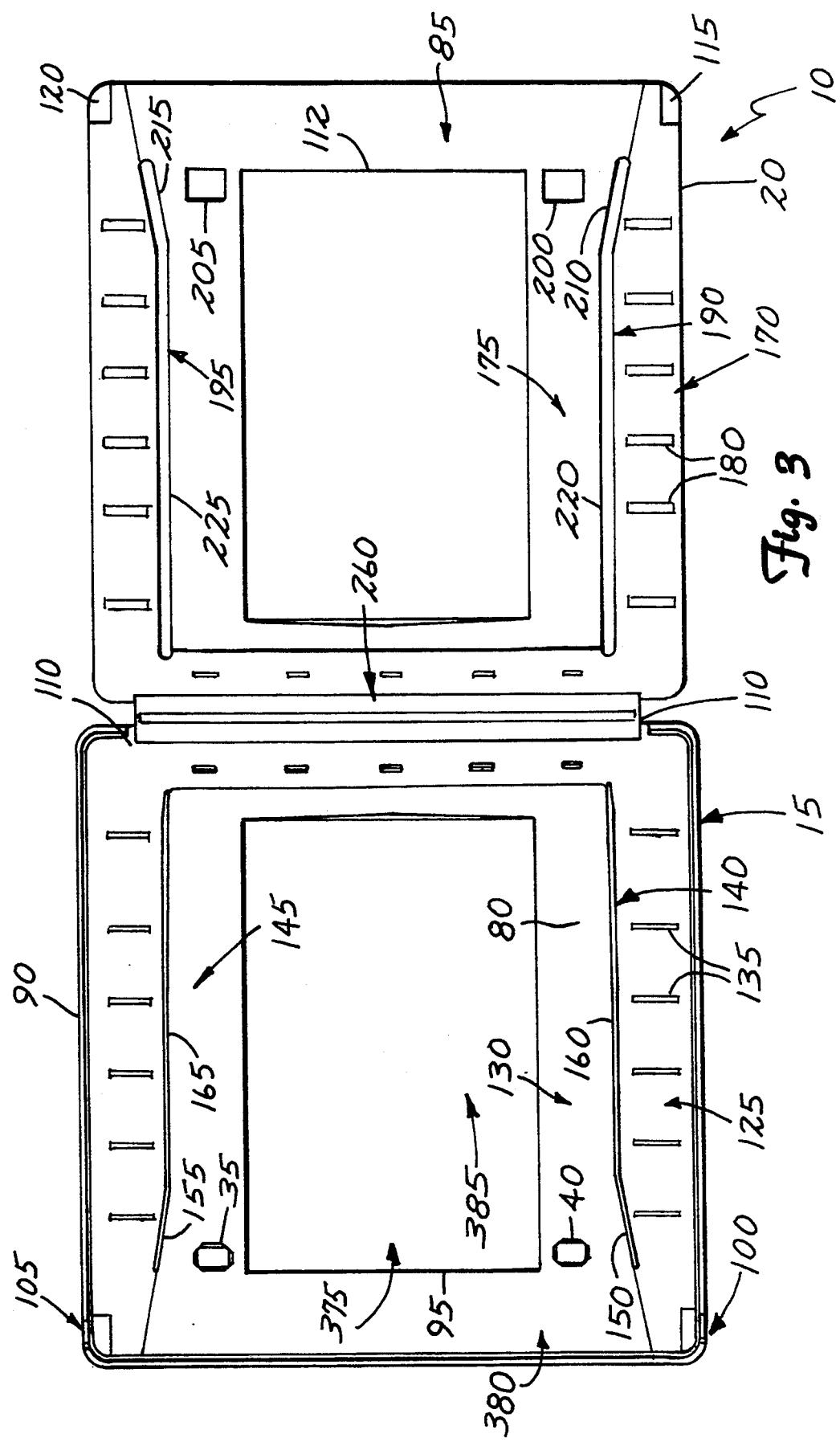
FIG. 3 is an overall top plan view of the slide mount of FIG. 1 opened to illustrate the design of the first and second frame portions.

The construction of the slide mount 10, and in particular, the first and second frame portions 15 and 20 is shown more clearly in FIG. 3. In FIG. 3, the slide mount 10 is opened to expose cooperating internal surfaces 80 and 85 defining the pocket between the first and second frame portions 15 and 20 into which the film transparency 75 is inserted. That is, internal surfaces 80 and 85 of the first and second frame portions 15 and 20, respectively, cooperatively define the pocket of the slide mount 10 when the first and second frame portions 15 and 20 are in opposed relation as shown in the final construction of FIG. 1.

First and second frame portions 15 and 20 are preferably formed as a unitary plastic unit. As shown in FIG. 3, the first frame portion 15 includes an outer ledge 90 and a central film window 95. The outer ledge 90 circumscribes the first frame portion 15 and includes opposed recesses 100 and 105 and a connection recess 110. The opposed recesses 100 and 105 are positioned at a forward end of the first frame portion 15 and the connection recess 110 is at a rear end.

The second frame portion 20 includes a central film window 112 and opposed recessed surfaces 115 and 120 at a forward end thereof. The opposed recesses 100 and 105 of the outer ledge 90 of the first frame portion 15 and the opposed recessed surfaces 115 and 120 of the second frame portion 20 cooperatively define the camming surfaces 45 and 50 as shown in FIG. 1.

The internal surface 80 of the first frame portion 15 includes a welding portion 125 (i.e., welded in the final construction as shown in FIG. 1) and a recessed film section 130. The welding portion 125 includes a plurality of raised surfaces 135 (sonic welding energy directors). The recessed film section 130 includes opposed raised guide rails 140 and 145 and the pin locks 35 and 40. The raised guide rails 140 and 145 are formed along an outer, longitudinal extent of the recessed film section 130. The guide rails 140 and 145 each include first tapered portions 150 and 155, respectively, and second portions 160 and 165.

The internal surface 85 of the second frame portion 20 includes a corresponding welding portion 170 and a film section 175. The welding portion 170 includes a plurality of grooves 180. The film section 175 includes opposed longitudinal depressions 190 and 195 formed along an outer longitudinal extent of the film section 175 and opposed through openings 200 and 205. Each of the longitudinal depressions 190 and 195 includes a first forward tapered portion 210 and 215 and a second portion 220 and 225, respectively.

As illustrated in FIGS. 4-6, the pin locks 35 and 40 of the first frame portion 15 are formed of a first bottom surface 235 formed integral with the first frame portion 15 and a second top surface 240 spaced some distance from the bottom surface 235 and first, second, third and fourth sloped contact surfaces 242, 243, 244 and 245, respectively connecting the bottom surface 235 and the top surface 240. The first bottom surface 235 has a larger dimension than the second surface 240 to define a taper for the pin locks 35 and 40. The sloped contact surfaces 242, 243, 244 and 245 are designed to contact edge surfaces of the sprocket holes 65.

Also, as shown, pin locks 35 and 40 have non-contact connecting surfaces 250 joining the first and second 242 and 243, second and third 243 and 244, third and fourth 244 and 245 and fourth and first 245 and 242 contact surfaces (FIG. 4). The non-contact connecting surfaces 250 are positioned so so as not to engage edge surfaces 65B of the sprocket holes 65 to facilitate insertion of the pin locks 35 and 40 through the sprocket holes 65. The height of a forward end 400 of the pin lock 35 or 40 is lower than the height of a rear end 402 to define a sloped top surface 240 to facilitate the advancement of the film into the pocket of the slide mount 10 (FIG. 5).

The first and second frame portions 15 and 25 are pivotally joined at the rear ends thereof by a plastic connection member 260 (FIG. 3) at the connection recess 110 of ledge 90 of the first frame portion 15. The first and second frame portions 15 and 20 are folded together so that the internal surfaces 80 and 85 are in opposed relation as shown in FIG. 1. In particular, when folded, the second frame portion 20 is seated within the ledge 90 of the first frame portion 15.

To complete the slide mount 10 construction, the first and second frame portions 15 and 20 are welded along respective welding portions 125 and 170. The cooperating raised surfaces 135 and grooves 180 facilitate welding. As shown in FIG. 3, the welding portions 125 and 170 extend along opposed sides of the slide mount 10 and along a rear end 10B thereof. A forward end 10A of the slide mount 10 is not welded to define the slit 30 (FIG. 1).

In the welded construction (FIG. 1), the film windows 95 and 112 of the first and second frame portions 15 and 20 define the aperture 25. The first and second portions 150, 155 and 160, 165 of the guide rails 140 and 145 of the first frame portion 15 cooperate with the first and second portions 210, 215 and 220, 225 of the depression 190 and 195 of the second frame portion 20 to define a film track 375 for inserting the film transparency 75. The first tapered portions 150 and 155 of the raised guide rails 140 and 145 cooperatively define a mouth portion 380 of the film track 375 at the forward end 10A of the slide mount 10. The second portions 160 and 165 cooperatively define a throat portion 385 of the film track 375 which extends from the mouth portion 380 to the rear end 10B of the slide mount 10. Further, the pin locks 35 and 40 of the first frame portion 15 are positioned between the tapered portions 150 and 155 of the raised rails 140 and 145 defining the mouth portion 380 of the film track 375 and extend through openings 200 and 205 of the second frame portion 20.

A film transparency 75 is inserted into the slide mount 10 by applying a separating force to the opposed camming surfaces 45 and 50 (arrow 10A, FIG. 1) to separate the first and second frame portions 15 and 20 (normally closed as shown in FIG. 1) at the slit 30 to open the pocket therebetween. A film transparency 75 is inserted through the slit 30 and along the film track 375 (FIG. 3). The mouth 380 of the film track 375 has a forward opening sized significantly larger than the width of the film transparency 75 and is tapered therefrom to gradually direct the film transparency 75 towards the throat 385 of the film track 375. The film transparency 75 is further inserted along the throat portion 385 of the film track 375 until the film transparency 75 reaches the rear end 10B of the slide mount 10 (FIG. 1).

Preferably the film web 60 is supported along a film plane and individual film transparencies 75 are severed therefrom and mechanically inserted into the slide mount 10 also aligned with the film plane. The first and second frame portions 15 and 20 are separated at the opposed camming surfaces 45 and 50. The first and second frame portions 15 and 20 are formed of a resilient plastic material and thus are flexed apart at the forward end 10A of the slide mount 10 when the separation force is applied to the opposed camming surfaces 45 and 50. The separation force is sufficient that the first and second frame portions 15 and 20 are flexed so that the pin locks 35 and 40 at the forward end 10A of the slide mount 10 move out of alignment from the film plane so that the film transparency 75 can be inserted past the pin locks 35 and 40 towards the rear end 10B of the slide mount 10.

The pin locks 35 and 40 are smaller than the sprocket holes 65 along the film transparencies 75, thus, when a film transparency 75 is inserted, the pin locks 35 and 40 extend through opposed sprocket holes 65A to secure the position of the film at the forward end 10A of the slide mount 10. The second portions 160 and 165 of the raised guide rails 140 and 145 are slightly tapered so that the width of the film track 375 at the rear end 10B of the slide mount 10 is closely sized with the film transparency 75 so that the raised guide rails 140 and 145 contact the film transparency 75 to restrict lateral movement of the film at the rear end 10B of the slide mount 10.

It is important that the mechanical insertion of a film transparency 75 into the slide mount 10 be accurately controlled so that the film transparency 75 is inserted so that the final sprocket holes 65A align with the pin locks 35 and 40. If the mechanical insertion is not precisely controlled, the pin locks 35 and 40 will not properly secure the film through the final sprocket holes 65A and as a result the photographic image may not be fixedly positioned within the aperture 25 of the slide mount 10.

Finally, since the first and second frame portions 15 and 20 are formed of a resilient plastic material, when the separating force is released after the film transparency 75 is fully inserted, the first and second frame portions 15 and 20 close to form the photographic slide.

Preferably, as shown in FIG. 5, the taper at the forward end 400 of pin locks 35 and 40 as shown in the side elevational view of FIG. 5 is approximately 10 percent. The taper at the rear end 402 is 3 percent. As shown in FIG. 6, preferably, the taper on the sides 404 of the pin locks 35 and 40 as shown in the front elevational view of FIG. 6 is approximately 10 percent. Additionally, preferably, the non-contact connecting surfaces 250 (FIG. 4) intersect contact surfaces 242, 243, 244 and 245 at a 45 degree angle.

Although the present invention has been described with reference to a preferred embodiment, workers skilled in the art will recognize that changes may be made in form and detail without departing from the spirit and scope of the invention. Finally, it should be recognized that the drawings are not drawn to scale and certain features have been exaggerated for clarity.

What is claimed is:

1. In a slide mount formed of first and second frame portions connected along an outer border to form a pocket therebetween, the first and second frame portions having rectangular film windows, the film windows of the first and second frame portions defining a central aperture, the slide mount including a slit at the outer border through which a film transparency having sprocket holes along lateral edges thereof can be slidably introduced into the pocket of the slide mount to prepare a photographic film slide wherein, the improvement comprises:

pin locks located on the first frame portion, the pin locks comprising:

a bottom surface integral with the first frame portion;

a top surface spaced from the bottom surface and dimensioned smaller than the bottom surface;

first, second, third and fourth sloped contact surfaces connecting the bottom surface and the top surface, with the first and the third sloped contact surfaces being positioned in spaced opposed relation and the second and the fourth sloped contact surfaces being positioned in spaced opposed relation, the first, the second, the third and the fourth sloped contact surfaces being positioned to engage edge surfaces of the sprocket holes of the film transparency when the film transparency is slidably introduced into the pocket of the slide mount to fix the position of the film transparency; and non-contact connecting surfaces joining the first and the second, the second and the third, the third and the fourth, and the fourth and the first sloped contact surfaces, the non-contact connecting surfaces being positioned so as not to engage edge surfaces of the sprocket holes to facilitate placement of the pin locks through the sprocket holes of the film transparency when the film transparency is slidably introduced into the pocket of the slide mount.

2. The slide mount of claim 1 wherein the top surface is sloped.

3. The slide mount of claim 1 wherein the height of the first sloped contact surface at a rear end of the pin lock is greater than the height of the third sloped contact surface at a forward end of the pin lock to define a sloped top surface.

4. The slide mount of claim 1 wherein the non-contact connecting surfaces are formed of planar surfaces.

5. The slide mount of claim 1 wherein the second frame portion includes through openings aligned with the pin locks extending from the first frame portion, the pin locks extending through the through openings when the first and second frame portions are closed.

6. In a slide mount formed of first and second frame portions connected along an outer border to form a pocket therebetween, the first and second frame portions having rectangular film windows, the film windows of the first and second frame portions defining a central aperture, the slide mount including a slit at the outer border through which a film transparency having sprocket holes along lateral edges thereof can be slidably introduced into the pocket of the slide mount to prepare a photographic film slide wherein, the improvement comprises:

pin locks located on the first frame portion, the pin locks comprising:

a bottom surface integral with the first frame portion;

a top surface spaced from the bottom surface and dimensioned smaller than the bottom surface;

first, second, third and fourth sloped contact surfaces connecting the bottom surface and the top surface, with the first and the third sloped contact surfaces being positioned in spaced opposed relation and the second and the fourth sloped contact surfaces being positioned in spaced opposed relation, the first, the second, the third and the fourth sloped contact surfaces being positioned to engage edge surfaces of the sprocket holes of the film transparency when the film transparency is slidably introduced into the pocket of the slide mount to fix the position of the film transparency; and non-contact connecting surfaces joining the first and the second, the second and the third, the third and the fourth and the fourth and the first sloped contact surfaces, the non-contact connecting surfaces being positioned so as not to engage edge surfaces of the sprocket holes to facilitate placement of the pin locks through the sprocket holes of the film transparency when the film transparency is slidably introduced into the pocket of the slide mount; and a film track formed of cooperating raised guide rails extending along opposed sides of one of said frame portions configured to cooperatively define:

a tapered mouth portion adjacent to the slit, the tapered mouth portion having an opening at a forward end of the slide mount, the distance between the cooperating raised guide rails at the opening to the tapered mouth portion defining a first width; and a throat portion extending from the tapered mouth portion toward a rear end of the slide mount along a remaining extent of the pocket, the distance between the cooperating raised guide rails forming the throat portion defining a second width which is smaller than the first width, wherein the tapered mouth portion initially guides the film transparency when the film transparency is slidably introduced into the pocket of the slide mount for placement and the throat portion fixes the film transparency to restrict lateral movement thereof.

7. The slide mount of claim 6 wherein the throat portion is slightly tapered.

8. The slide mount of claim 7 wherein the cooperating raised guide rails defining the throat portion contact the lateral edges of the film transparency when the film transparency is slidably introduced into the pocket of the slide mount.

9. The slide mount of claim 6 wherein the second frame portion includes through openings aligned with the pin locks extending from the first frame portion, the pin locks extending through the through openings when the first and second frame portions are closed.

10. The slide mount of claim 6 wherein the pin locks are positioned at the forward end of the slide mount between the cooperating raised guide rails defining the tapered mouth portion.

11. The slide mount of claim 9 wherein the cooperating raised guide rails defining the throat portion contact the film transparency when the film transparency is slidably introduced into the pocket of the slide mount to laterally fix the film transparency at the rear end of the slide mount.

12. In combination:

a film transparency having sprocket holes along lateral edges thereof; and a slide mount including:

first and second frame portions connected along an outer border to form a pocket therebetween, the first and second frame portions including rectangular film windows, the film windows of the first and second frame portions defining a central aperture, a slit at the outer border through which the film transparency can be slidably introduced into the pocket of the slide mount; and pin locks located on the first frame portion, the pin locks being sized smaller than the sprocket holes along the film transparency for extending through the sprocket holes of the film transparency when the film transparency is slidably introduced into the pocket of the slide mount, the pin locks comprising:

a bottom surface integral with the first frame portion;

a top surface spaced from the bottom surface and dimensioned smaller than the bottom surface;

first, second, third and fourth sloped contact surfaces connecting the bottom surface and the top surface, with the first and the third sloped contact surfaces being positioned in spaced opposed relation and the second and the fourth sloped contact surfaces being positioned in spaced opposed relation, the first, the second, the third and the fourth sloped contact surfaces being positioned to engage edge surfaces of the sprocket holes of the film transparency when the film transparency is slidably introduced into the pocket of the slide mount to fix the position of the film transparency; and non-contact connecting surfaces joining the first and the second, the second and the third, the third and the fourth, and the fourth and the first sloped contact surfaces, the non-contact connecting surfaces being positioned so as not to engage edge surfaces of the sprocket holes to facilitate placement of the pin locks through the sprocket holes of the film transparency when the film transparency is slidably introduced into the pocket of the slide mount.

13. The combination of claim 12 wherein the non-contact connecting surfaces intersect said contact surfaces at approximately 45 degrees.

14. The combination of claim 12 wherein the non-contact connecting surfaces are formed of planar surfaces.

15. The combination of claim 14 wherein the non-contact connecting surfaces intersect said contact surfaces at approximately 45 degrees.

16. In a slide mount formed of first and second frame portions connected along an outer border to form a pocket therebetween, the first and second frame portions having rectangular film windows, the film windows of the first and second frame portions defining a central aperture, the slide mount including a slit at the outer border through which a film transparency having sprocket holes along lateral edges thereof can be slidably introduced into the pocket of the slide mount to prepare a photographic film slide wherein, the improvement comprises:

pin locks located on the first frame portion, the pin locks comprising:

a bottom surface integral with the first frame portion;

a top surface spaced from the bottom surface;

first, second, third and fourth contact surfaces connecting the bottom surface and the top surface, with the first and the third contact surfaces being positioned in spaced opposed relation and the second and the fourth contact surfaces being positioned in spaced opposed relation, the first, the second, the third and the fourth contact surfaces being positioned to engage edge surfaces of the sprocket holes of the film transparency when the film transparency is slidably introduced into the pocket of the slide mount to fix the position of the film transparency; and non-contact connecting surfaces joining the first and the second, the second and the third, the third and the fourth and, the fourth and the first contact surfaces, the non-contact connecting surfaces being positioned so as not to engage edge surfaces of the sprocket holes to facilitate placement of the pin locks through the sprocket holes of the film transparency when the film transparency is slidably introduced into the pocket of the slide mount.

17. The slide mount of claim 16 wherein the non-contact connecting surfaces are formed of planar-surfaces.

18. In a slide mount formed of first and second frame portions connected along an outer border to form a pocket therebetween, the first and second frame portions having rectangular film windows, the film windows of the first and second frame portions defining a central aperture, the slide mount including a slit at the outer border through which a film transparency having sprocket holes along lateral edges thereof can be slidably introduced into the pocket of the slide mount to prepare a photographic film slide wherein, the improvement comprises:

pin locks located on the first frame portion, the pin locks being formed of a polyhedron with front, rear and lateral sides tapered upwardly from the first frame portion, wherein said front, rear and lateral sides form raised tapered portions which connect top and bottom surfaces, wherein the bottom surface is dimensioned larger both laterally and longitudinally than the top surface.

19. The slide mount of claim 18 wherein the pin locks are octagonally shaped.

* * * * *